(12) United States Patent
Bouchenoire

(10) Patent No.: US 9,856,903 B2
(45) Date of Patent: Jan. 2, 2018

(54) DEVICE FOR ATTACHING AN OBJECT ON A RAIL OF A SUPPORT

(71) Applicant: ATTAX, Carrieres sur Seine (FR)

(72) Inventor: Marc Bouchenoire, Herblay (FR)

(73) Assignee: ATTAX, Carrieres sur Seine (FR)

( * ) Notice: Subject to any disclaimer, the term of this patent is extended or adjusted under 35 U.S.C. 154(b) by 156 days.

(21) Appl. No.: 14/680,853

(22) Filed: Apr. 7, 2015

(65) Prior Publication Data

US 2016/0298674 A1 Oct. 13, 2016

(30) Foreign Application Priority Data

Apr. 7, 2014 (FR) ..................................... 14 53050

(51) Int. Cl.
| | |
|---|---|
| *F16B 39/28* | (2006.01) |
| *B60N 2/07* | (2006.01) |
| *B64D 11/06* | (2006.01) |
| *B60R 16/04* | (2006.01) |
| *F16B 37/04* | (2006.01) |
| *F16B 39/10* | (2006.01) |
| *F16B 5/06* | (2006.01) |

(52) U.S. Cl.
CPC ............ *F16B 39/28* (2013.01); *B60N 2/0715* (2013.01); *B60R 16/04* (2013.01); *B64D 11/0696* (2013.01); *F16B 37/045* (2013.01); *F16B 39/10* (2013.01); *F16B 5/0642* (2013.01)

(58) Field of Classification Search
CPC ...... F16B 39/28; F16B 39/282; F16B 39/284; F16B 37/045; F16B 39/10; F16B 39/103; B60N 2/01558; B60N 2/01575; B60N 2/01508; B60N 2/01516; B60N 2/01566; B60N 2/01583; B60N 2/0715; B60N 2/15; B60R 16/04; B64D 11/0696
USPC .... 411/91, 84, 108, 109, 120, 121; 248/424, 248/429, 500, 503, 503.1
See application file for complete search history.

(56) References Cited

U.S. PATENT DOCUMENTS

| | | | |
|---|---|---|---|
| 1,349,491 A | 8/1920 | Burton | |
| 3,392,954 A * | 7/1968 | Malitte | ..................... A47C 1/12 |
| | | | 248/393 |

(Continued)

FOREIGN PATENT DOCUMENTS

| | | |
|---|---|---|
| EP | 0 431 786 A1 | 6/1991 |
| GB | 2 275 296 A | 8/1994 |

OTHER PUBLICATIONS

Search Report from priority application No. FR 14 53050 dated Dec. 17, 2013 in 3 pages.

*Primary Examiner* — Joshua J Michener
*Assistant Examiner* — Matthew J Gitlin
(74) *Attorney, Agent, or Firm* — Knobbe Martens Olson and Bear, LLP

(57) ABSTRACT

A device for attaching an object on a rail of a support is provided. The device includes a base designed to bear on the rail, and a device for tightening the base on the rail. The tightening device includes a threaded rod and a nut. A first end of the tightening device includes a tightening heel designed to be placed below the rail to tighten the rail between the heel and the base. A second end of the tightening device includes an element for maneuvering by an operator to tighten/loosen the device. The device can further include a detachable non-return device to prevent any involuntary loosening of the device.

8 Claims, 1 Drawing Sheet

(56) References Cited

U.S. PATENT DOCUMENTS

| | | | | |
|---|---|---|---|---|
| 3,594,876 A * | 7/1971 | Gunther | ............... | F16B 21/04 411/555 |
| 4,089,500 A * | 5/1978 | Gustafsson | ............ | B60N 2/0705 248/429 |
| 4,493,470 A * | 1/1985 | Engel | ............... | B64D 11/0696 244/118.6 |
| 4,666,355 A * | 5/1987 | Stover | ............... | F16B 37/046 411/104 |
| 4,911,381 A * | 3/1990 | Cannon | ............... | B64D 25/04 244/122 R |
| 5,044,856 A * | 9/1991 | Jerabek | ............... | F16B 21/02 411/349 |
| 5,178,346 A * | 1/1993 | Beroth | ............... | B64D 11/0696 244/118.1 |
| 5,244,178 A * | 9/1993 | Stewart | ............... | B60N 2/005 248/300 |
| 5,271,586 A * | 12/1993 | Schmidt | ............... | F16L 3/24 248/58 |
| 5,579,970 A * | 12/1996 | Cucheran | ............... | B60R 9/045 224/321 |
| 5,593,265 A * | 1/1997 | Kizer | ............... | F16B 21/02 403/325 |
| 5,655,865 A * | 8/1997 | Plank | ............... | E04D 3/08 403/257 |
| 5,975,822 A * | 11/1999 | Ruff | ............... | B64D 11/0696 292/218 |
| 6,817,815 B2 * | 11/2004 | Ross | ............... | F16B 35/048 411/107 |
| 7,021,596 B2 * | 4/2006 | Lory | ............... | B60P 7/0815 248/423 |
| 7,040,849 B2 * | 5/2006 | Cunningham | ............ | B60P 7/0815 410/104 |
| 7,073,995 B2 * | 7/2006 | Herb | ............... | F16B 37/046 411/104 |
| 7,175,377 B2 * | 2/2007 | Womack | ............... | B60P 7/0815 410/104 |
| 7,401,995 B2 * | 7/2008 | Senakiewich, II | .... | B60P 7/0815 403/252 |
| 7,976,256 B2 * | 7/2011 | Womack | ............... | B60P 7/0815 410/104 |
| 8,408,853 B2 * | 4/2013 | Womack | ............... | B60P 7/0815 410/104 |
| 9,098,252 B2 * | 8/2015 | Sauer | ............... | G06F 1/186 |
| 2008/0089758 A1 | 4/2008 | Meisner | | |
| 2010/0260580 A1 * | 10/2010 | Andersson | ............... | F16B 39/24 411/534 |
| 2013/0216326 A1 * | 8/2013 | Womack | ............... | B60P 7/0815 410/105 |
| 2014/0271036 A1 * | 9/2014 | Emmerich | ............... | F16B 39/08 411/500 |
| 2015/0047197 A1 * | 2/2015 | Deloubes | ............ | B64D 11/0696 29/897.2 |

* cited by examiner

DEVICE FOR ATTACHING AN OBJECT ON A RAIL OF A SUPPORT

BACKGROUND

The present invention relates to a device for attaching an object on a rail of a support.

Such attaching devices for example have already been used to attach objects such as seats or other objects on rails of a support for example formed by an airplane floor, motor vehicle floor, etc. Such devices are for example described in documents GB 2,275,296 and US 2008/089758.

Such devices for example comprise a base designed to be placed on or below the rail and to bear against that rail.

This space for example comprises a screw-nut tightening device for tightening the base on the rail, in order to lock the object in position on the rail and therefore on the support.

This screw/nut device for example comprises a threaded rod or a rod associated with a threaded part, engaged in a tapped hole of the base. One end of the rod comprises a tightening heel designed to be placed below the rail to tighten the latter between that heel and the base. Another end of the rod comprises elements for maneuvering that rod, for example by an operator, to allow it to be tightened or loosened from the rail.

The maneuvering elements for example comprise lateral protruding portions or a cavity designed to receive the tool, allowing an operator to tighten or loosen the device.

However, these devices have a certain number of drawbacks in terms of separation risks of the assembly, for example due to incorrect manipulations or vibrations encountered in this type of application.

In addition, these devices are fairly complicated to handle.

SUMMARY

The aim of a certain embodiment of the invention is therefore to resolve these problems.

To that end, an aspect the invention relates to a device for attaching an object on a rail of a support, comprising a base designed to bear on the rail and a device for tightening the base on the rail, the tightening device comprising a threaded rod and a nut, a first end of the tightening device comprising a tightening heel designed to be placed below the rail to tighten said rail between the heel and the base, a second end of the tightening device comprising an element for maneuvering by an operator to tighten/loosen the device, said device further comprising a detachable non-return device to prevent any involuntary loosening of the device, said disengageable non-return device comprising a sleeve placed around the threaded rod, secured in rotation with said threaded rod and elastically biased bearing against a collar of the base, the collar and the sleeve comprising complementary non-return indentations.

According to other advantageous features of the device according to a certain embodiment of the invention, considered alone or in combination:

- the device comprises an elastic biasing member for biasing the sleeve against the collar of the base, preferably formed by a helical spring;
- the collar is integral with the base;
- the non-return device can be disengaged by an operator.

An aspect of the invention also relates to an assembly comprising an attachment device as previously described and a rail able to be assembled to said attachment device and a support.

An aspect of the invention also relates to an assembly comprising an attachment device as previously described and an object able to be attached to a support by said device, the object being a seat.

BRIEF DESCRIPTION OF THE DRAWINGS

An aspect of the invention also relates to an assembly comprising an attachment device as previously described, a rail able to be assembled to said attachment device and a support assembled to rail, the support being an aircraft floor. Embodiments of invention will be better understood using the following description, provided solely as an example and done in reference to the appended drawings, in which.

DETAILED DESCRIPTION

Figure 1:
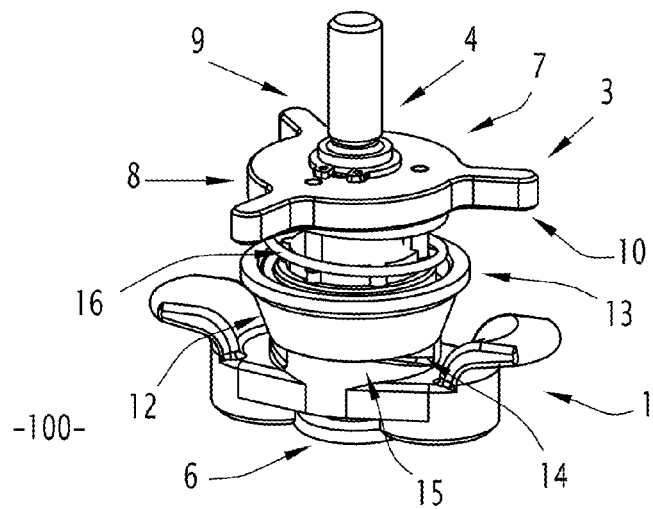
FIG. 1 shows a perspective view of an attachment device according to one example embodiment of the invention.
Figure 2:
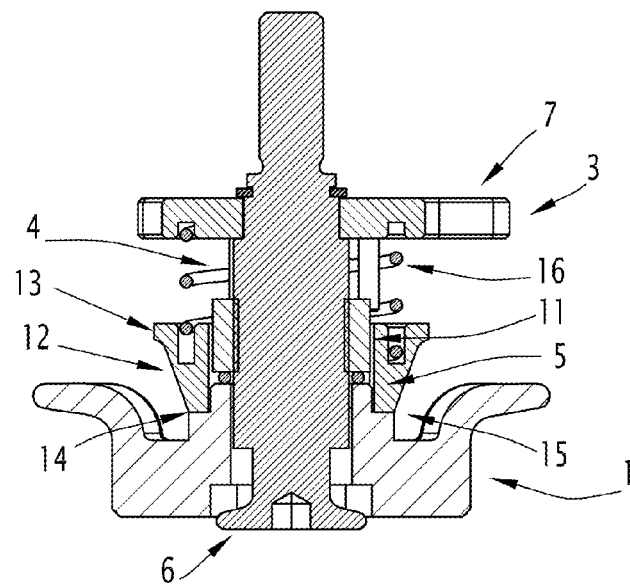
FIG. 2 shows a cross-sectional view of the device of FIG. 1.
Figure 3:
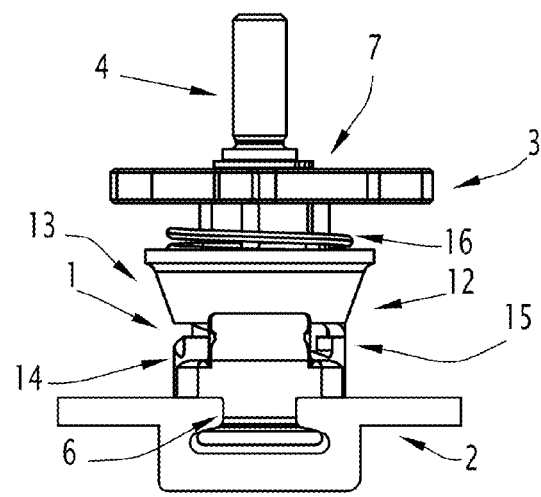
FIG. 3 shows a side view of the device of FIGS. 1 and 2, in position in an attachment rail of the support.

FIGS. 1 to 3 show a device 100 for attaching an object on a rail of a support.

The object is for example made up of an aircraft seat or any other object designed to be attached on a floor of any type of support, such as an aircraft.

Of course, other supports may be considered, for example a motor vehicle floor.

The attachment device 100 comprises a base 1. In the described example, the space 1 is designed to be placed bearing on a rail 2, as illustrated in FIG. 3.

Furthermore, the attachment device 100 comprises a screw/nut device 3 for tightening the base 1 on or against the rail 2.

As illustrated in FIG. 2, the screw/nut device 3 comprises a rod 4 that is placed in a hole 5 of the base 1. The rod 4 has a tightening heel 6 at one end, designed to be placed below the rail 2 to tighten and pinch said rail 2 between the base 1 and the heel 6 under the action of the screw/nut device 3.

To that end, the other end of the rod 4 comprises a maneuvering element 7. In the illustrated example, the maneuvering element 7 is formed by protruding parts 8, 9 and 10 allowing operators to rotate the rod 4 in either direction relative to the base 1.

The rod 4 is for example in the form of a threaded part and engaged in a tapped sleeve designated by general reference 11, associated with the base 1.

If the maneuvering element 7 is rotated in either direction, the rod 4 is rotated in either direction. Thus, by cooperation with the tapped part of the sleeve 11, the rod 4 is raised or lowered in the base 1; the tightening heel 6 is therefore brought closer to or, on the contrary, further from the base 1 so as to tighten or loosen the attachment device 100 on the rail 2, by pinching the rail between the base 1 and the heel 6.

The screw/nut device 3 is associated with a detachable non-return device 12 to prevent any untimely or unwanted loosening of the device.

This detachable non-return device 12 is for example interposed between the rod 4 and the base 1.

The detachable non-return device 12 for example comprises a sleeve 13 placed around the rod 4. The sleeve 13 is secured in rotation with the rod 4 and is elastically biased so that one of its ends bears against a corresponding collar 14 of the base 1. The collar 14 is for example integral with the base 1.

The surfaces across from this collar 14 of the sleeve 13 are provided with complementary non-return indentations 15.

The sleeve 13 is elastically biased bearing against the collar 14 of the base by means of an elastic biasing member, for example formed by a helical spring 16.

When the operator wishes to tighten the attachment device 100, he can rotate the rod 4 using the maneuvering element 7, by rotating said element 7, for example in the clockwise direction looking at the device from above.

During this rotational movement, the sleeve 13 supported by the rod 4 also rotates; the elastic biasing member 16 of the sleeve 13 allows said sleeve 13 to move axially around the rod 4, to withdraw on said rod 4. The indentations 15 of the sleeve 13 can thus cross the corresponding indentations 15 of the collar 14 of the base, so as to tighten the heel 6 below the rail 2. The rail 2 is therefore tightened between the heel 6 and the base 1 to lock the device 100, and therefore the object, such as the seat, in position on the rail 2 and therefore on the floor.

Any untimely or unwanted loosening of the device 100 is prevented by the non-return indentations 15 provided on the opposite surfaces of the sleeve 13 of the base 1, and more particularly the collar 14 of said base.

When an operator wishes to loosen the attachment device 100, he axially retracts the sleeve 13 by lifting against the elastic bias of the helical spring 16, to separate the indentations 15 of the sleeve 13 and the corresponding indentations of the collar 14 of the base 1.

Once the sleeve is retracted, the operator can then rotate the rod 4, for example in the counterclockwise direction, so as to loosen the attachment device 100.

Such a device has a certain number of advantages in terms of its attachment reliability. In fact, it is impossible for such a device to loosen accidentally or in an untimely manner, for example due to vibrations. An operator wishing to loosen the attachment device need only initiate a release maneuver for the sleeve and the non-return indentations, so as to disengage them and allow loosening of the device.

Of course, other embodiments can be considered.

What is claimed is:

1. An attachment device for attaching an object on a rail of a support, comprising:
    a base designed to bear on the rail; and
    a tightening device for tightening the base on the rail,
    the tightening device comprising a tightening heel designed to be placed below the rail to tighten said rail between the heel and the base, a second end of the tightening device comprising an element for maneuvering by an operator to tighten/loosen the device,
    said device further comprising a disengageable non-return device to prevent any involuntary loosening of the device,
    said disengageable non-return device comprising a sleeve placed around a threaded rod, secured in rotation with said threaded rod and elastically biased bearing against a collar of the base, the collar and the sleeve comprising complementary non-return indentations.

2. The attachment device according to claim 1, comprising an elastic bias configured to bias the sleeve against the collar of the base.

3. The attachment device according to claim 2, wherein the bias is formed by a helical spring.

4. The attachment device according to claim 1, wherein the collar is integral with the base.

5. The attachment device according to claim 1, wherein the disengageable non-return device can be disengaged by an operator.

6. An assembly comprising the attachment device according to claim 1, further comprising a rail that can be assembled to the attachment device, and a support.

7. The assembly according to claim 6, further comprising a seat configured to be attached to the support by the attachment device.

8. The assembly according to claim 6, wherein the support assembled to the rail and the support is an aircraft floor.

* * * * *